US010771741B1

(12) United States Patent
Reynolds et al.

(10) Patent No.: US 10,771,741 B1
(45) Date of Patent: *Sep. 8, 2020

(54) ADDING AN INDIVIDUAL TO A VIDEO CONFERENCE

(71) Applicant: INTERNATIONAL BUSINESS MACHINES CORPORATION, Armonk, NY (US)

(72) Inventors: Spencer Thomas Reynolds, Austin, TX (US); Brian Lee White Eagle, Austin, TX (US); Steven Garrett Raden, Austin, TX (US); Cameron Jeoffrey Wilks, Herndon, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/460,234

(22) Filed: Jul. 2, 2019

Related U.S. Application Data (63) Continuation of application No. 16/428,130, filed on May 31, 2019.

(51) Int. Cl.

| H04N 7/15 | (2006.01) |
|---|---|
| G06K 9/00 | (2006.01) |
| G06K 9/62 | (2006.01) |
| H04N 5/247 | (2006.01) |
| H04N 7/14 | (2006.01) |

(Continued)

(52) U.S. Cl.
CPC ........... *H04N 7/15* (2013.01); *G06K 9/00362* (2013.01); *G06K 9/6201* (2013.01); *H04N 5/247* (2013.01); *H04N 5/4403* (2013.01); *H04N 7/142* (2013.01); *G06F 3/017* (2013.01); *G06F 3/167* (2013.01); *H04N 2005/443* (2013.01)

(58) Field of Classification Search
USPC ............................................ 348/14.01–14.09
See application file for complete search history.

(56) References Cited

U.S. PATENT DOCUMENTS

| 7,243,123 B1 | 7/2007 | Allen et al. |
|---|---|---|
| 8,917,306 B2 | 12/2014 | Zhang |

(Continued)

OTHER PUBLICATIONS

IBM: List of IBM Patents or Patent Applications Treated as Related (Appendix P), Jul. 17, 2019, pp. 1-2.

(Continued)

*Primary Examiner* — Maria El-Zoobi
(74) *Attorney, Agent, or Firm* — Ewa M. Wozniak (57) ABSTRACT

A method, computer system, and computer program product for adding individual to a video conference. The method may include capturing a first video stream of a user from a first camera of a device and providing the first video to a device of at least one video conference participant other than the user. The method may include capturing and analyzing second video stream from second camera to detect whether an individual appears in the second video stream. In response to detecting an individual in the second video stream, the method may include determining an identity for the individual and prompting the user to confirm adding the individual to the video conference. In response to receiving the confirmation from the user to add the individual to the video conference, the method may include adding the second video stream to the video conference, thereby adding the individual to the video conference.

8 Claims, 5 Drawing Sheets

(51) Int. Cl.
*H04N 5/44* (2011.01)
*G06F 3/16* (2006.01)
*G06F 3/01* (2006.01)

(56) References Cited

U.S. PATENT DOCUMENTS

| | | | |
|---|---|---|---|
| 9,179,097 | B2 | 11/2015 | Kuscher et al. |
| 9,237,307 | B1 | 1/2016 | Vendrow |
| 9,357,167 | B2 | 5/2016 | Liu et al. |
| 9,706,171 | B1 | 7/2017 | Riley et al. |
| 2009/0089683 | A1* | 4/2009 | Thapa ............... H04L 65/1089 715/756 |
| 2011/0149809 | A1 | 6/2011 | Narayanaswamy |
| 2011/0249078 | A1* | 10/2011 | Abuan ............... G06F 3/04817 348/14.02 |
| 2013/0027504 | A1* | 1/2013 | Zhang ............... H04L 12/1813 348/14.08 |
| 2017/0070706 | A1 | 3/2017 | Ursin et al. |
| 2017/0331952 | A1* | 11/2017 | Rogers ............... H04N 7/147 |

OTHER PUBLICATIONS

Mell et al., "The NIST Definition of Cloud Computing", Recommendations of the National Institute of Standards and Technology, NIST Special Publication 800-145, Sep. 2011, 7 pages.

Disclosed Anonymously, "Auto-Correction of Images of a Participant Eyes in a Virtual Collaboration Session", An IP.com Prior Art Database Technical Disclosure, ip.com No. IPCOM000226803D, IP.com Electronic Publication Date: Apr. 22, 2013, 18 pages.

Hansen et al., "Using Virtual CSRCS to Differentiate Media From Different Users and Capture Sources", An IP.com Prior Art Database Technical Disclosure, IP.com No. IPCOM000240372D, IP.com Electronic Publication Date: Jan. 27, 2015, 7 pages.

Disclosed Anonymously, "Splitting a Video Stream Into Multiple Substreams Such That Each Substream Can Be Displayed in It's Own Separate Video Area", an IP.com Prior Art Database Technical Disclosure, IP.com No. IPCOM000240930D, IP.com Electronic Publication Date: Mar. 12, 2015, 4 pages.

Hansen et al., "Minimizing Degradation of Non-Virtual Reality (VR) Users Experience in a Mixed VR/Non-VR Remote Conference", an IP.com Prior Art Database Technical Disclosure, IP.com No. IPCOM000253308D, IP.com Electronic Publication Date: Mar. 21, 2018, 8 pages.

New York Workers' Compensation Board, "Virtual Hearings, Guide for Witnesses and Other Participants", 2017, pp. 1-13.

Sophia D., "Video Conferencing Market Growth Remains Strong, But a Bloody Consolidation Is Coming", VCDAILY, Mar. 20, 2018, pp. 1-3, https://www.videoconferencingdaily.com/trending/video-conferencing-market-growth-remains-strong-bloody-consolidation-coming/.

Pending U.S. Appl. No. 16/428,130, filed May 31, 2019, entitled: "Adding an Individual to a Video Conference", pp. 1-42.

* cited by examiner

ADDING AN INDIVIDUAL TO A VIDEO CONFERENCE

BACKGROUND

Embodiments of the present invention relate generally to a method, system and computer program for adding an individual to a video conference.

There are many user devices where each user device has multiple cameras. Typically, such user devices have front and rear facing cameras. These cameras may be used simultaneously to enable video conferencing.

BRIEF SUMMARY

An embodiment of the present invention may include a method, computer system, and computer program product for adding an individual to a video conference. The method may include capturing a first video stream of a user from a first camera of a user device and providing the first video to a device of at least one video conference participant other than the user. The method may include capturing and analyzing a second video stream from a second camera to detect whether an individual appears in the second video stream. In response to detecting an individual in the second video stream, the method may include determining an identity for the individual and prompting the user to confirm adding the individual to the video conference. In response to receiving the confirmation from the user to add the individual to the video conference, the method may also include adding the second video stream to the video conference, thereby adding the individual to the video conference. The first camera may be on a first side of the user device and the second camera may be on a different side of the user device. The second camera may be on an IoT device. The method may include determining the identity for the individual by capturing an image of the individual appearing in the second camera and comparing the image of the individual captured by the second camera to a photo stored in a database.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for adding an individual to a video conference. Many user devices, such as mobile phones and tablets, have multiple cameras. Typically, these user devices may have front facing cameras and back facing cameras. A user that is using such a user device to conduct a video conference may use the front facing camera to show the user speaking from the device. However, the user may have to switch the view from the front facing camera to the back facing camera to show something in the user's environment.

Oftentimes, the user, who is participating on a video conference, may wish to add an individual to that ongoing video conference. The user may allow that individual to try and squeeze into the front facing camera's field of view so that both the individual and the user may be seen by other participants of the video conference. The user of the user device that is being used to conduct the video conference may switch the camera stream from front facing to back facing. This may allow other participants of the video conference to see the individual but not the user. The user may also add the individual to the ongoing video conference by having the individual use the individual's user device to separately join the video conference. However, this may be problematic because it may involve many steps. The user may have to find the add function on the user device that allows other participants to be added. Another step may involve the video conferencing system reaching out to the individual on the user device the individual has enabled for the video conference to invite the individual to participate. The individual may then have to accept the invitation. Oftentimes, the individual may have to configure the audio and video settings of the user device the individual is using to participate in the video conference. As such, there exists a need to efficiently add an individual to an ongoing video conference without disrupting the user and other video conference participants.

Accordingly, at least some of the embodiments described herein provide a technical solution to the problems described above with respect to adding an individual to a video conference. Specifically, some embodiments described herein provide a method of adding an individual to an ongoing video conference with without disrupting the user or other participants. Moreover, the embodiments described herein may reduce power consumption of the user device by allowing the user to add an individual to a video conference using a single prompt response. The single prompt response may be in the form of a touch response, a gesture response, or a voice response.

Reference will now be made in detail to the embodiments of the present invention, examples of which are illustrated in the accompanying drawings, wherein like reference numerals refer to like elements throughout. Embodiments of the invention are generally directed to adding an individual to a video conference.

Figure 1:
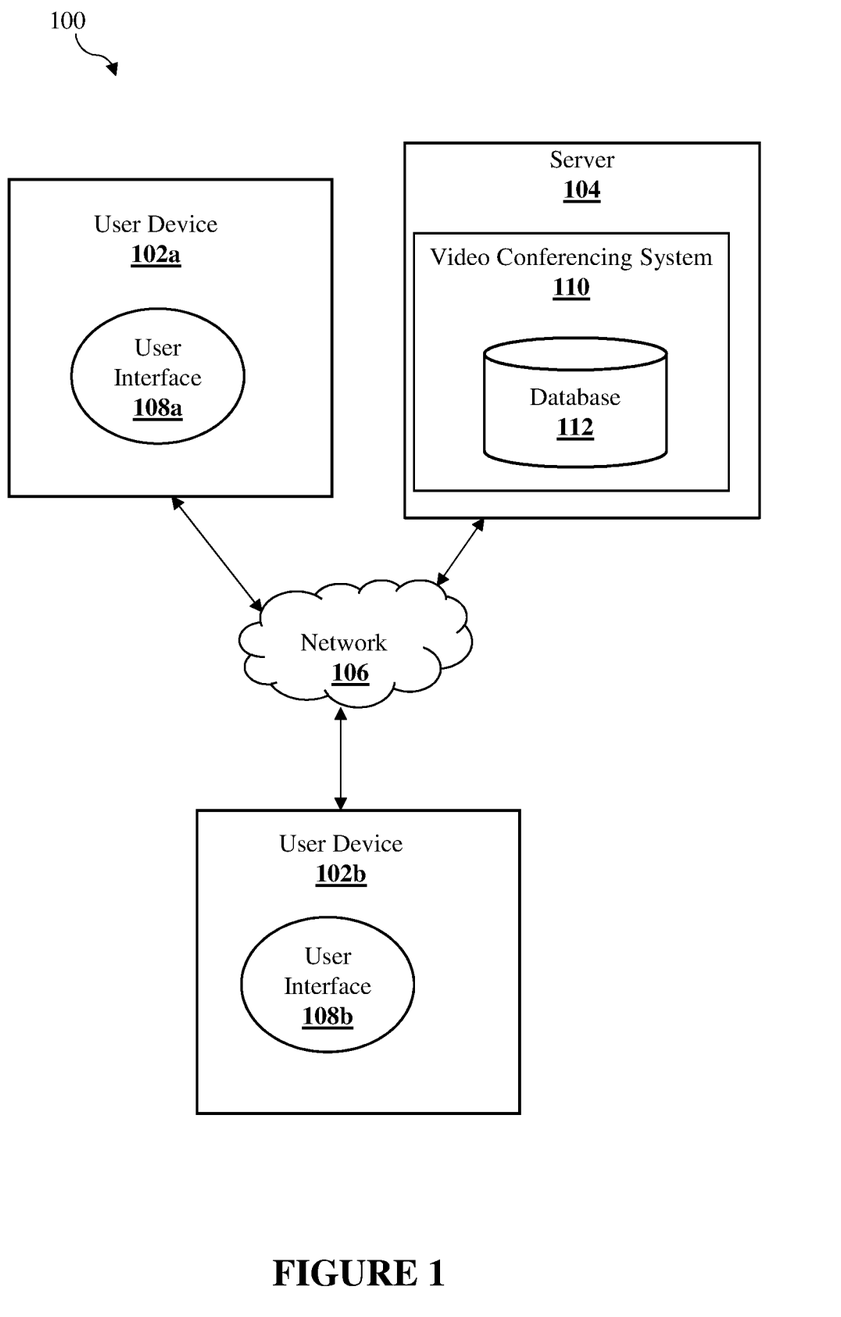
FIG. 1 is a schematic block diagram illustrating a system for adding an individual to a video conference, in accordance with an embodiment of the invention.

FIG. 1 illustrates a system 100 for adding an individual to a video conference, in accordance with an embodiment of the present invention. In an example embodiment, the system 100 may include user devices 102a, 102b and a server 104, all connected via one or more networks 106.

In the example embodiment, the network 106 is the Internet, representing a world wide collection of networks and gateways to support communications between devices connected to the Internet. The network 106 may include, for example, wired, wireless, or fiber optic connections. In alternative embodiments, the network 106 may be implemented as an intranet, a local area network (LAN), or a wide area network (WAN). In general, the network 106 can be any combination of connections and protocols that will support communications between the user devices 102 and the server 104. The network 106 may be an example of a communications network 1200 illustrated in FIG. 3.

The user devices 102a, 102b may include user interface 108a, 108b, respectively. The user devices 102a, 102b may be a desktop computer, a notebook, a laptop computer, a tablet computer, a handheld device, a smart-phone, a cellular phone, a thin client, or any other electronic device, computing system, wired or wireless device that contains multiple cameras, that may be used, at the same time, for video conferencing. For example, the user device 102a, 102b may be a smart-phone with multiple cameras. The first camera may be on a first side of the smart-phone and the second camera may be on a different side of the smart-phone. The first camera may be a front facing camera and the second camera may be a back facing camera. The front facing camera may be used to capture a first video stream and the back facing camera may be used to capture a second video stream. The first video camera may capture the first video stream where the user is holding the smart-phone while the second video camera may capture the second video stream where an individual is in front of the user that is holding the user device 102. Although FIG. 1 illustrates two user devices, user device 102a and user device 102b, it should be appreciated that principles of an embodiment of the present invention are not restricted to two user devices 102 and may be used with any number of user devices. For example, the first user may be using user device 102a and the second user may be using user device 102b. Both the first and the second user are participating in the same video conference using their respective user devices 102a and 102b.

The user interface 108 may include components used to receive input from a user on the user device 102 and transmit the input to another user device and display the information to the user on the user device 102. For example, the user interface 108 may display the video conference that the user is participating in by streaming a video stream from either a first or second camera of the user device 102. Further, the user interface 108 may also display different prompts, such as, a prompt to add an individual to the video conference, a prompt to end the video conference, or a prompt to change video conference settings. The video conference settings may include voice settings, display settings, camera settings, or any other settings that may be adjusted on the user device 102.

The server 104 may include a video conferencing system 110. In the example embodiment, the server 104 may be a desktop computer, a notebook, a laptop computer, a tablet computer, a thin client, or any other electronic device or computing system capable of storing, compiling, and organizing audio, visual, or textual content during a video conference, and receiving and sending that content to and from other computing devices, such as the user devices 102a, 102b. The server 104 may also be a remote server. For example, the server 104 may bet at a Cloud location remote from the user devices 102a, 102b, such as a video conferencing server.

The video conferencing system 110 may include a database 112. The video conferencing system 110 may be used by the user to create a user registration. The video conferencing system 110 may also be used to capture a second video stream, identify that an individual appearing in the second video stream is a registered user, and add the second video stream to a video conference, thereby adding the individual that video conference. Although FIG. 1 illustrates the video conferencing system 110 included in a server 104 remote from the user devices 102a, 102b, it should be appreciated that the video conferencing system 110 may be included in the user devices 102a, 102b in the form of an application.

The database 112 may store identifying information of each user that registers to use the video conferencing system 110. In an embodiment of the present invention, the identifying information may include a name, a mailing address, an email address, a phone number, a social security number, a user name, a nickname, facial characteristics, a photo, or a voice recording of the user. The identifying information may also include an image of the user, a voice recording sample of the user, or any other information personal to the user that may be used to identify the user.

Figure 2:
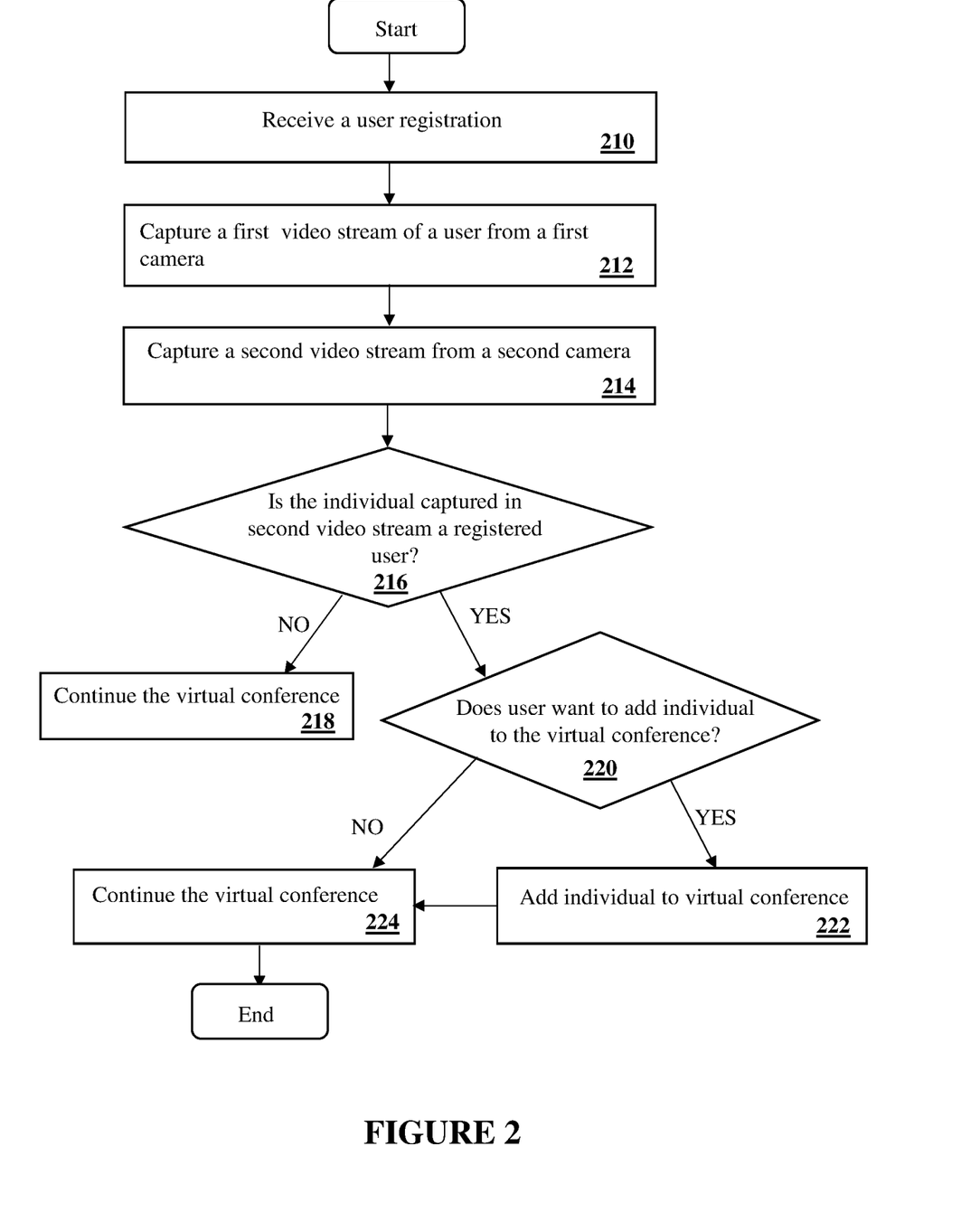
FIG. 2 is a flow chart illustrating an example method for adding an individual to a video conference, in accordance with an embodiment of the invention.

Referring to FIG. 2, a method 200 for adding an individual to a video conference is depicted, in accordance with an embodiment of the present invention.

Referring to operation 210, the video conferencing system 110 receives a user registration. In an embodiment of the present invention, the user may register with the video conferencing system 110. The user may utilize an application of the video conferencing system 110 or the video conferencing system's 110 website to register by providing the video conferencing system 110 the user's identifying information. For example, the user may use a video conferencing system application, installed on the user device 102, to fill out a registration form, and create log-in credentials. The user may then use the log-in credentials to log-in to the video conferencing system 110 each time the user may want to use the video conferencing system 110. Optionally, the user may stay logged into the video conferencing system 110 or create an automatic log-in setting.

During the registration process, the video conferencing system 110 may collect identifying information of the user and store that information in database 112. For example, the identifying information may include the name, mailing address, email address, phone number, social security number, user name, nickname, facial characteristics, photo, or voice recording of the user. Once the user is registered with the video conferencing system 110, the user may use the system 110 to initiate a video conference or participate in an ongoing video conference with other registered users. The identifying information may be used to identify the user as a potential participant in a video conference.

Once the user is logged into the video conferencing system 110, the video conferencing system 110 captures, at operation 212, a first video stream of the user from a first camera. For example, the first camera may be the front facing camera of the user device 102 and the first video stream may be the video of the user displaying himself/herself while participating in a video conference.

The video conferencing system 110 may actively scan the environment, using additional cameras, such as a secondary camera, to identify other potential individuals that may be added to the ongoing video conference. According to an embodiment, the secondary camera may be the back facing camera on the user device 102 being used for the video conference.

Referring to operation 214, when the video conferencing system 110 scans the environment via the secondary camera, it may capture a second video stream from a second camera. In an embodiment of the present invention, the second camera may be the back facing camera of the user device 102 that is being used by the user to stream the first video stream using the front facing camera of the user device 102. The back facing camera of the user device 102 may be actively scanning the environment in order to capture a second video stream.

According to another embodiment, the video conferencing system 110 may capture a second video stream from a secondary camera that is disposed at a fixed or semi-permanent location, such as an "Internet of Things" (IoT) device. The "Internet of Things" may refer to a network of physical objects or "things" that are embedded with and/or otherwise include electronics, software, cameras, sensors, and network connectivity that allow these objects to collect and exchange data. Exemplary IoT devices include, but are not limited to, televisions, clocks, phones, faxes, printers, light bulbs, routers, refrigerators, ovens, stoves, stereos, media players and/or recorders, and so forth.

The user of a second camera, associated with an IoT device, may be more apparent with the following example. The user may be participating in a video conference while sitting in a conference room. The user may be using the front facing camera of the user device 102 to display himself/herself to at least one other video conference participant. The conference room may be equipped with an IoT device such as a projector that has a camera built in. When an individual, other than the user, walks into the conference room, the projector's camera may capture a video stream. This video stream may be the second video stream and the projector's camera may be the second camera. The projector's camera may communicate with the video conferencing system 110, via the network 106, to provide the video conferencing system 110 with the captured video stream so that the video conferencing system 110 may analyze the feed to determine the identity of the individual.

Once the second video stream from the second camera is captured, the video conferencing system 110 analyzes the second video stream to determine whether an individual has appeared in the second video stream. When the video conferencing system 110 determines that an individual appeared in the second video stream, the video conferencing system 110, at operation 216, analyzes the second video stream, using for example image or voice recognition software or near-field communication (NFC) technology, to determine whether the individual captured in the second video stream is a registered user.

The video conferencing system 110 may utilize different tools to analyze the second video stream in order to determine whether the individual is a registered user. The video conferencing system 110 may utilize image recognition software to determine features and visual elements from digital image data provided by the second camera. For example, the video conferencing system 110 may employ known algorithms such as deep learning convolutional neural network techniques, edge detection algorithms, active contour algorithms, blob detection methods, or scale-invariant feature transform algorithms. Techniques for recognizing and classifying features and visual elements are well known in the art, and any suitable technique or combination of techniques may be employed by the video conferencing system 110 for image recognition.

In an example embodiment of the present invention, the video conferencing system 110 may use an image recognition software compare the picture of the individual that appears in the second video with all images of the registered users the video conferencing system 110 has stored in its database 112. It should be appreciated that the image recognition software may also be used to determine features and visual elements from digital image data provided by the first camera, or any other camera that is being used by the video conferencing system 110 during a video conference, such as, for example, IoT cameras.

The video conferencing system 110 may utilize voice recognition software to identify or verify the identity of the individual in order to determine whether the individual is a registered user. The video conferencing system 110 may verify the identity of the individual by comparing the individual's voice to the voice sample recording of that individual stored in the database 112. For example, the individual, captured by the second camera, may state "I am Jane Doe." The video conferencing system 110 may take that voice recording and compare it to the voice recording sample of Jane Doe that is stored in the database 112 to determine that the individual, captured by the second camera, really is Jane Doe.

When the recording matches the voice recording sample of Jane Doe, the video conferencing system 110 determines that the individual is Jane Doe and that Jane is a registered user. The video conferencing system 110 then proceeds to operation 220. When the recording does not match the voice recording sample of Jane Doe, the video conferencing system 110 compares that voice recording to all voice recording samples it has stored in database 112 to determine whether the individual is a registered user. If the video conferencing system 110 finds a match and identifies the individual, the video conferencing system 110 proceeds to operation 220. If however the video conferencing system 110 does not find a match and cannot identify the individual, the video conferencing system 110 may store the voice recording in its database 112 and may use that voice recording as a sample recording when that particular individual decides to register with the video conferencing system 110.

The video conferencing system 110 may also identify the individual by comparing the individual's voice against all voice recording samples stored in its database 112. For example, the video conferencing system 110 may record the second video stream to capture the individual speaking and compare that recording to all the voice recording samples it has stored in the database 112, using the voice recognition software. For example, the video conferencing system 110 captures the second video stream, from the second camera. In that second video stream, the individual says "Good Morning" but does not state his/her name. The video conferencing system 110 may take that recording and may compare it to all the recordings stored in its database 112 to determine the identity of the individual. When the recording matches a particular voice recording sample, the video conferencing system 110 may identify the individual.

When the recording does not match any of the voice recording samples stored in the database 112, the video conferencing system 110 may not identify the individual. The video conferencing system 110 may utilize other means of recognition, such as image recognition software to identify the individual. If the individual cannot be identified, the video conferencing system 110 may optionally store the recording in its database 112 and use that recording as an additional sample voice recording when that particular individual decides to register with the video conferencing system 110. For example, during the registration process, the individual provides the video conferencing system 110 with a sample voice recording. The video conferencing system 110 may compare the sample voice recording provided by the individual with all other sample voice recordings it has stored in the database 112 which have not been associated with a particular user account to determine whether there is a match. If the video conferencing system 110 finds a match, the video conferencing system 110 may then add the matched sample voice recordings to that individual's account and store these voice recordings as sample voice recordings in the database 112.

The video conferencing system 110 may verify the identity of the individual by utilizing near-field communication (NFC) technology. NFC technology may utilize communication protocols allowing user devices 102a, 102b to communicate with each other, IoT devices, or other devices, such as, for example, car key fob via the network 106. For example, the video conferencing system 110, using NFC technology, may communicate with a mobile phone of an individual that is captured by the second video camera to determine the identity of that individual. For example, user A, sitting in a conference room, is using user device 102a to participate in a video conference. An individual, carrying his/her mobile phone, enters the field of view of the second camera that is on the user device 102a. Utilizing NFC technology the user device 102a communicates with the individual's mobile phone allowing the video conferencing system 110 to determine that the individual is likely Jane Doe. The video conferencing system 110 determines that the individual is likely Jane Doe because the individual's mobile phone is registered under the name of Jane Doe. The video conferencing system 110 may then further analyze the second video stream to determine that the individual is in fact Jane Doe by using image and/or voice recognition software.

The video conferencing system 110 may use image and/or voice recognition to determine whether there is a match with the images or voice recording samples stored in its database 112. When the comparison between what is captured by the second camera and what is stored in the database 112 results in a match, the video conferencing system 110 determines that the individual is a registered user. When the comparison does not result in a match, the video conferencing system 110 determines that the individual is not a registered user. If the identified individual is not a registered user, the video conferencing system 110, at operation 218, continues with the video conference without asking the user whether the individual and the second video stream should be added to the video conference.

In an alternative embodiment of the present invention, the video conferencing system 110 may prompt the user whether to add the individual that appears in the second video stream when the video conferencing system 110 determines that the individual is not a registered user. The user may then decide whether the individual, even though not registered, should still participate in the video conference. When the user decides to add the individual to the video conference, the video conferencing system 110 adds the video stream from the second camera to the video conference. Optionally, the video conferencing system 110 may store the image or voice recording of the unregistered individual in its database 112 for subsequent comparisons.

Referring back to operation 216, the video conferencing system 110 determines whether the individual appearing in the second video stream is a registered user.

Referring to operation 220, if the individual is a registered user, the video conferencing system 110 prompts the user regarding adding the individual to the video conference. For example, the video conferencing system 110 may determine that the individual appearing on the second video stream is "Jane Doe." The video conferencing system 110 may prompt the user by displaying, on the user interface 108 of the user device 102 of the user, Jane Doe's information along with a question whether the user wishes to add Jane Doe to the conference. The user may then use the user interface 108 to either select yes or no. In another example, the video conferencing system 110 may prompt the user regarding adding the individual to the video conference by utilizing a voice prompt. For example, the video conferencing system 110 may ask the user the following question: "Do you wish to add Jane Doe to the video conference?" The user may then state "Yes" or "No". Alternatively, the user may also use a hand gesture, such as, for example, a thumbs up sign to add Jane Doe to the video conference or a thumbs down signal to not add Jane Doe to the video conference.

Referring to operation 222, when the user decides to add the individual to the video conference, the user confirms the addition of the individual using a single prompt response, such as, for example, a touch response, a gesture response, or a voice response, and the video conferencing system 110 adds the individual to the video conference. The video conferencing system 110 utilizes the second camera to stream the second video stream so that each participant of the video conference, including the user, sees the newly added individual. It should be appreciated that each user of the video conferencing system 110 may be able to add individuals appearing in their respective second video streams. For example, user A is on an ongoing video conference with user B. User A is using user device 102a, while user B is using user device 102b. User device 102a captures, with its secondary camera, an individual A whereas user device 102b captures, with its secondary camera, an individual B. The video conferencing system 110 determines that both individual A and individual B are registered users. The video conferencing system 110 prompts user A to confirm adding individual A to the video conference. The video conferencing system 110 also prompts user B to confirm adding individual B to the video conference. Both user A and user B may then add their respective individuals or decline the addition.

Referring to operation 224, when the user decides not to add the individual to the video conference, the video conferencing system 110 continues streaming the video conference without the individual.

Figure 3:
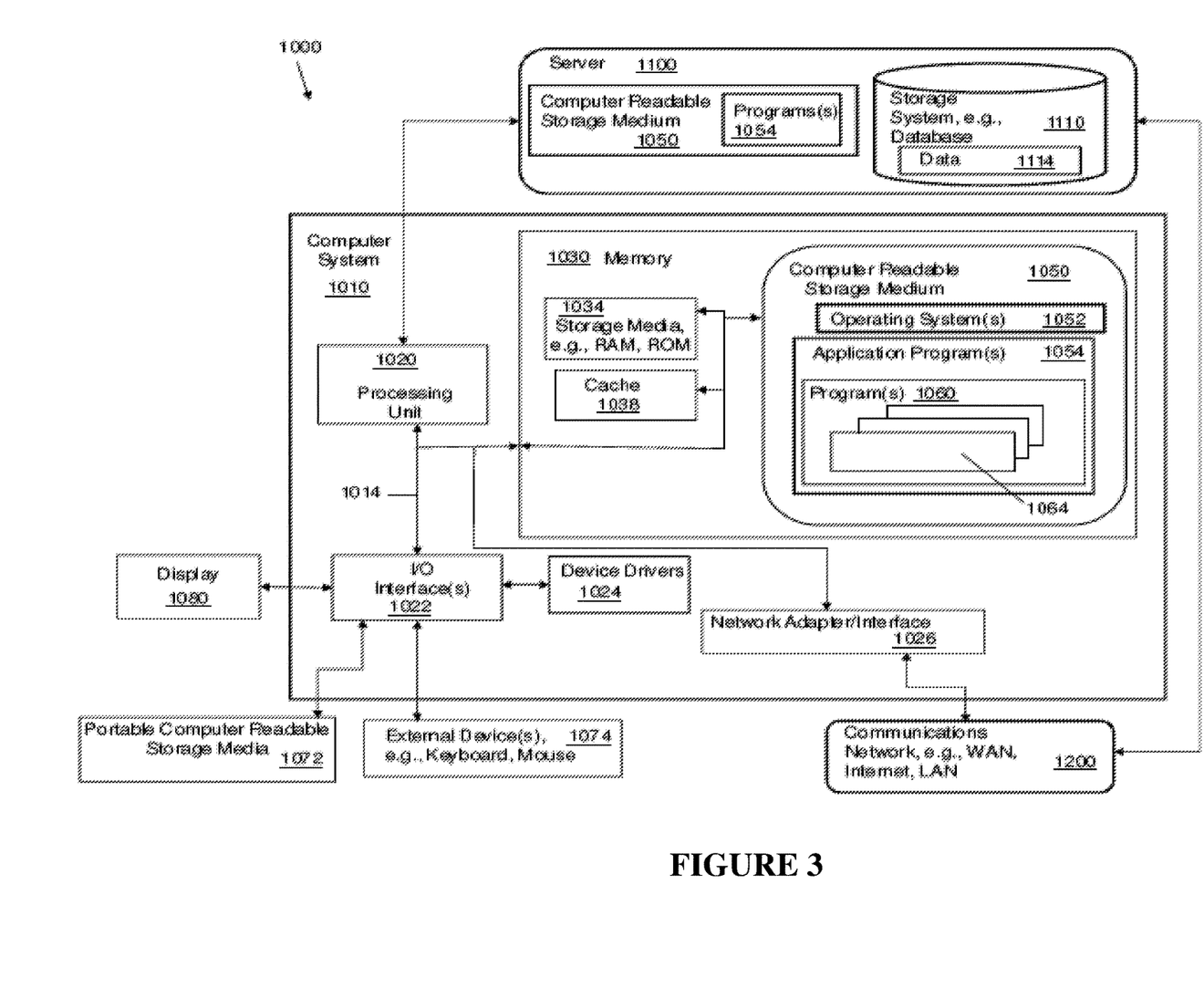
FIG. 3 is a block diagram depicting the hardware components of a system for adding an individual to a vidoe conference, in accordance with an embodiment of the invention.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative peripheral devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
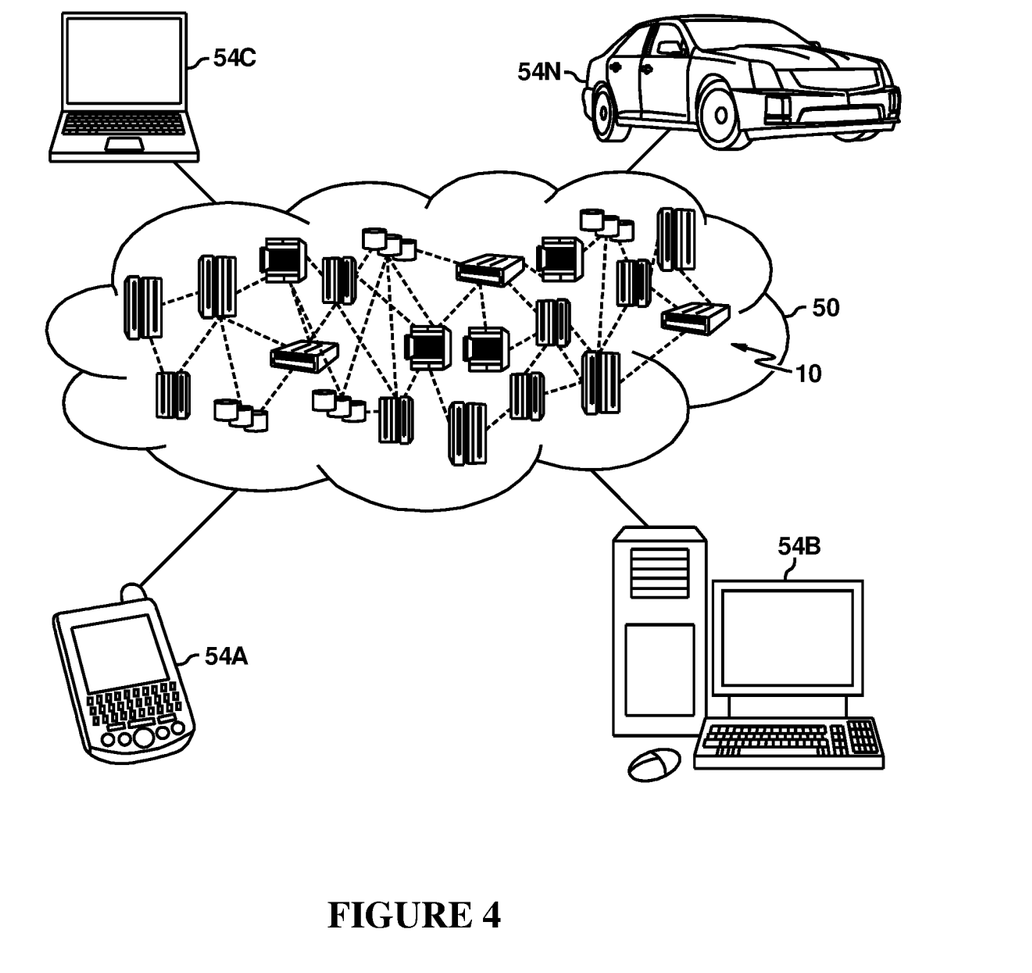
FIG. 4 is a functional block diagram depicting a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
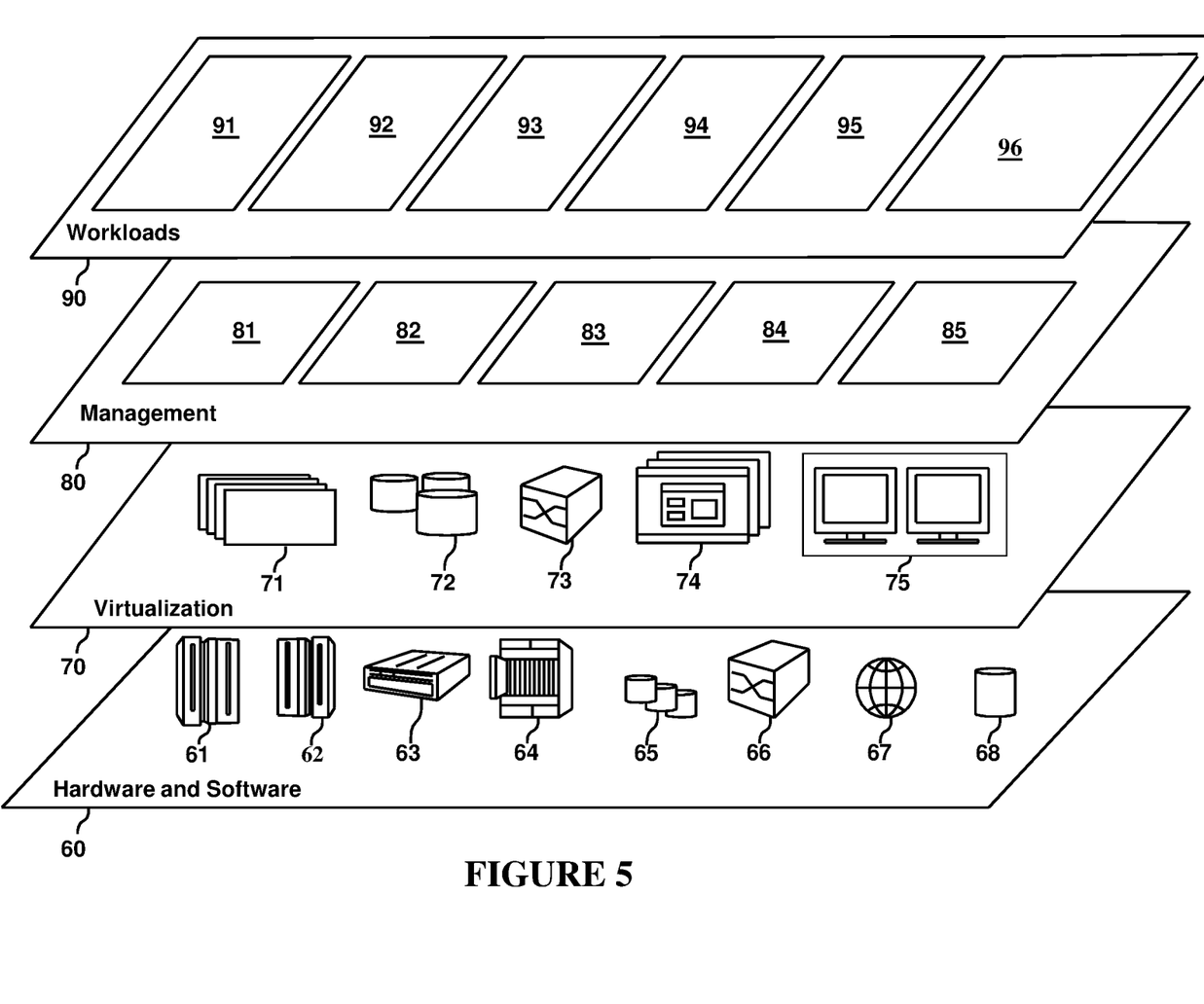
FIG. 5 is a diagram depicting abstraction model layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adding participants to a virtual conference 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for adding an individual to a video conference, comprising:
    capturing a first video stream of a user from a first camera of a user device and providing the first video to a device of at least one video conference participant other than the user;
    actively scanning, while the user is participating in the video conference, an environment where the user is located using a second camera to capture a second video stream from the second camera;
    analyzing the second video stream captured by the second camera to determine whether an individual appears in the second video stream;
    in response to detecting the individual in the second video stream, determining an identity for the individual;
    prompting the user to confirm adding the individual to the video conference; and
    in response to receiving the confirmation from the user to add the individual to the video conference, adding the second video stream to the ongoing video conference, thereby adding the individual to the video conference.

2. The method of claim 1, wherein the first camera is on a first side of the user device and the second camera is on a different side of the user device.

3. The method of claim 1, wherein the first camera is on a first side of the user device and the second camera is on an IOT device.

4. The method of claim 1, wherein the adding the second video stream to the video conference is performed using a single prompt response.

5. The method of claim 4, wherein the single prompt response is a touch response.

6. The method of claim 4, wherein the single prompt response is a gesture response.

7. The method of claim 4, wherein the single prompt response is a voice response.

8. The method of claim 1, wherein determining the identity for the individual further comprising:
- capturing an image of the individual appearing in the second camera; and
- comparing the image of the individual captured by the second camera to a photo stored in a database.

* * * * *